United States Patent [19]

Shannon

[11] Patent Number: 5,033,823
[45] Date of Patent: Jul. 23, 1991

[54] LIQUID CRYSTAL DISPLAY DEVICE

[75] Inventor: John M. Shannon, Whyteleafe, England

[73] Assignee: U.S. Philips Corporation, New York, N.Y.

[21] Appl. No.: 576,332

[22] Filed: Aug. 31, 1990

Related U.S. Application Data

[62] Division of Ser. No. 174,565, Mar. 29, 1988, Pat. No. 4,983,022.

[30] Foreign Application Priority Data

Apr. 16, 1987 [GB] United Kingdom ............... 8709186

[51] Int. Cl.$^5$ .......................... G02F 1/13; G09G 3/36
[52] U.S. Cl. .................................... 350/333; 350/334; 350/336; 350/339 R; 340/784
[58] Field of Search .................. 350/333, 334, 339 R, 350/336, 331 R; 340/719, 784

[56] References Cited

U.S. PATENT DOCUMENTS

| | | | |
|---|---|---|---|
| 4,223,308 | 9/1980 | Baraff et al. | 340/719 |
| 4,413,883 | 11/1983 | Baraff et al. | 350/334 |
| 4,728,175 | 3/1988 | Baron | 350/336 |
| 4,978,951 | 12/1990 | Knapp | 350/333 X |
| 4,983,022 | 1/1991 | Shannon | 350/333 |

Primary Examiner—Stanley D. Miller
Assistant Examiner—Huy K. Mai
Attorney, Agent, or Firm—Paul R. Miller

[57] ABSTRACT

A liquid crystal display device of the active matrix kind having an array of picture elements (10) defined by opposing electrodes (34;45,14), carried on respective supporting plates (20,22) with switching elements (16), such as two terminal bidirectional diode structures, arranged serially between address lines (12) and one set of picture element, PE, electrodes on one plate, in which the one set of PE electrodes overlie the address lines with the switching elements disposed therebetween, thus allowing close packing of the elements. For transmissive mode operation the PE electrodes and address lines, and maybe the switching elements, are transparent. A high degree of fault tolerance is obtained by providing a plurality of switching elements for each picture element, and dividing each of the one set of PE electrodes into a plurality of sub-electrodes, each associated with a respective one or more switching elements. The switching elements may be capacitively coupled to the PE electrodes. The device may further include conductive layers on the one plate forming storage capacitors associated with the picture elements and serving to screen the PE electrodes.

8 Claims, 6 Drawing Sheets

LIQUID CRYSTAL DISPLAY DEVICE

This application is a divisional of parent application Ser. No. 174,565, filed Mar. 29, 1988, now U.S. Pat. No. 4,983,022 and all benefits of such earlier application are hereby claimed for this new divisional application.

This invention relates to a liquid crystal display device comprising a pair of spaced supporting plates, liquid crystal material between the plates, a plurality of picture elements in a matrix array, each picture element being defined by opposing electrodes provided on the supporting plates, and a plurality of switching elements carried on one of the supporting plates and connected in series between address lines on that plate and the picture elements.

A liquid crystal display device of this kind, which is more precisely referred to as an active matrix addressed liquid crystal display device, is suitable for displaying alpha-numeric or video information.

In one known form of such a display device, thin film transistors, TFTs, are used as the switching elements. The picture elements, and likewise the TFTs, are arranged in rows and columns and sets of column and row address lines are carried on the one supporting plate. The gates of all TFTs in each row are connected to a respective row address line and the sources of all TFTs in each column are connected to a respective column address line. The drains of the TFTs are connected to individual picture element electrodes provided on that plate. A line-at-a-time addressing technique is usually employed with each row of TFTs being switched "on" in turn and, for example, video information signals simultaneously applied to the column address lines, these signals appearing on the picture element electrodes via the "on" TFTs in the rows. After a set period, the row of TFTs is turned "off" and the next row of TFTs turned "on". The video information across the picture elements in the first addressed row is maintained, due to the natural capacitance of the picture element and the high impedance of the TFTs in their "off" state, until the next time that row is addressed, that is, during the next video field.

In other forms of display devices a simplified structure is achieved using two terminal non-linear elements as the switching elements. These elements may be in the form of diodes structures for example as described in U.S. Pat. No. 4,223,308, or as described in British Patent Specification 2,091,468 in which the diode structures comprise MIMs (Metal-Insulator-Metal structures). In these devices, the picture elements are arranged in rows and columns with one of the supporting plates carrying, for example, rows of address lines and other plate carrying columns of address lines each of which is connected via the series two terminal switching elements to the individual picture element electrodes associated with that column.

In all the above-described known forms of liquid crystal display devices, it is common for the switching elements and the associated address lines to be positioned laterally of their associated picture element electrodes on the one supporting plate and connected with the picture element electrodes by means of extensions formed integrally with the electrodes. Accordingly, when considering the available area of the display device, a certain proportion of the available area is devoted to the switching elements and associated address lines, and the picture element electrodes are restricted to the remaining available area. In order therefore to maximise the proportion of available area occupied by the actual picture elements, it has been necessary to keep the physical size of both the switching elements and the associated address lines to a minimum.

It has long been recognised that the nature of the active matrix addressed display devices renders them difficult to manufacture sufficiently reliably in large area arrays and problems with yield have been common. Failure of the individual switching elements causes picture element defects and can lead to whole rows or columns of picture elements being defective rendering the device unusable. In an attempt to alleviate this problem of yield, it has been proposed in TFT type display devices that each picture element be associated with more than one, typically two, TFTs for redundancy purposes However, the provision of additional switching elements results in a further reduction in the area available for the actual picture elements and, for a given size of display device, therefore increases the ratio of non-effective display production areas to effective display production area.

It is an object of the present invention to provide an active matrix addressed liquid crystal display device in which the ratio of non-effective to effective display production areas can be minimised.

It is another object of the present invention to provide an active matrix addressed liquid crystal display device which has a degree of fault tolerance so that it is less susceptible to the effects of addressing element defects.

It is a further object of the present invention to provide an active matrix addressed liquid crystal display device which lends itself to comparatively simple manufacturing processes and which is economic to manufacture.

According to the present invention there is provided a liquid crystal display device as described in the opening paragraph which is characterised in that the picture element electrodes on the one supporting plate overlie both the switching elements and the associated address lines on that one supporting plate with the switching elements being disposed between those picture element electrodes and address lines.

With such a display device, the need to reserve areas on the one supporting plate to accommodate the provision of laterally arranged switching elements and addressed lines, as in the aforementioned earlier constructions, is avoided. By using a vertical, rather than lateral, structure the picture elements can be disposed closer together Hence, the area of the one supporting plate which can be devoted to the picture element electrodes can be increased, leading to a maximisation of the ratio of the actual area effective in producing a display to the remaining area not contributing to the production of a display, and a more effective utilisation of the supporting plate area for display production purposes.

Moreover, with such a vertical structure, each of these address lines on the one supporting plate can have a width up to the width of the picture element. In practice, the transverse dimension of the address lines may therefore be substantially the same as that of the picture element with the transverse dimension of the address lines serving to define the corresponding dimension of the picture elements.

The display device may be adapted for operation in the reflective mode. In a preferred embodiment, however, the device is adapted to operate in the transmissive mode. In this case, and in order that the address lines on the one supporting plate do not impede the passage of light through the picture elements significantly, those address lines are made substantially transparent, for example, of indium tin oxide (ITO).

For simplicity and convenience the switching elements are preferably two terminal, bidirectional, non-linear devices such as diode structures. In view of the fact that such diode structures, for example MIMs (Metal-Insulator-Metal structures) can readily be formed in a very small size relative to the picture element, their presence below the picture element need not affect significantly the passage of light through the display device. In order to avoid any possibility of light transmission being impeded and to achieve optimum transmission properties, the switching elements may be formed so as to exhibit substantial transparency to light. For example, the elements may comprise a substantially transparent diode structure comprising a thin film of silicon nitride sandwiched between two layers of ITO and acting in the manner of a MIM structure with the ITO layers serving in effect as the metal components.

In view of their transparency, it is not necessary to restrict the physical dimensions of the switching element to minimise the area they occupy, as is the case with, for example, laterally-arranged TFTs, to maximise the utilisable display area.

In a preferred embodiment of the invention, a plurality of two terminal switching elements are provided for each of the picture elements for fault tolerance purposes, the elements being operable in parallel with one another with their respective first terminals connected to the associated address line. In the case where the display device is intended to be operated in the transmissive mode, the switching elements can be formed as substantially transparent elements, so that the provision of pluralities of switching elements beneath each of the picture element electrodes does not impair light transmission through the picture elements, although this may not be necessary in view of the small size of the individual switching elements relative to the size of the picture elements. The number of transparent switching elements which can be provided for each picture element is not limited by light transmission considerations but merely by the relative physical dimensions of the switching elements and the picture elements.

In order to utilise the provision of a plurality of switching elements for each picture element most beneficially for fault tolerance purposes, each picture element electrode on the one supporting plate preferably comprises a plurality of discrete sub-electrodes each of which is connected to a respective one or more of the plurality of switching elements. In this manner, each picture element is, in effect, divided into a number of sub-picture elements each being individually controllable through its associated one or more switching elements. Thus, when a display signal is applied to the picture elements, the individual sub-picture elements of each of the picture elements are switched independently of one another via their respective switching elements to produce a display effect from the picture element. An acceptable display effect can still be achieved even if one or more of the sub-picture elements is non-operable, depending on the number of sub-picture elements and their size relative to the picture element itself. Although the display effect produced by a picture element having a few defective sub-picture elements will inevitably be affected to some extent, this may not be perceived by a viewer when viewing a device comprising a great number of picture elements typically hundreds of thousands, each of which occupies an area of only, say, 300 by 300 micrometers. The device may therefore still be used with satisfactory results with a number of picture elements being affected in this manner unlike known devices employing a single switching element for each whole picture element where failure of a switching element results in complete failure of at least the associated picture element, and perhaps renders the device unusable.

As in conventional matrix liquid crystal display devices, the picture element electrodes on the one supporting plate are generally planar, extending in a plane substantially parallel to the facing surface of the supporting plate, and in this case, therefore, the plurality of switching elements associated with the picture element conveniently may be arranged substantially in a planar array underlying the picture element electrodes. The array of switching elements associated with each picture element may occupy an area corresponding with at least a major portion of the area of the picture element electrodes and preferably the array is such that the switching elements of the array are arranged, and spaced from one another, substantially uniformly with respect to the area of the picture element electrodes. In other words, the plurality of switching elements for each picture element can be spread out to occupy individual and evenly-spaced discrete regions of an area beneath the picture element electrode which corresponds substantially to the area of the picture element.

The use of diode structures as two-terminal, bidirectional, switching elements is especially attractive and enables further advantages to be obtained. As previously mentioned, the diode structures may be a kind of MIM comprising indium tin oxide (ITO) layers as the "metal" components and silicon nitride, for example in the form of non-stoichiometric silicon nitride, as the insulator component sandwiched therebetween, these materials being substantially transparent to visible light in thin layer form. Alternatively, silicon oxide may be used instead of silicon nitride. Another form of MIM type element which could be employed may comprise an anodised tantalum film with an overlying conductive layer, which need not necessarily be transparent. In one embodiment of the invention, a deposited conductive layer, for example of ITO, and acting as one of the conductive terminal layers of the diode structure may also serve as the picture element electrode. In other words, the picture element electrode is formed integrally with one of the diode structure's conductive terminal components as a unitary layer. The other conductive terminal component of the diode structure may conveniently be constituted by a respective portion of one of the set of parallel address lines carried on the one supporting plate, the first-mentioned conductive terminal layer being spaced vertically of the supporting plate from this address line by a thin layer of insulator, for example, silicon nitride. The other supporting plate of the display device carries a second set of parallel conductors arranged at right angles to the first set, in an x-y configuration, with areas of overlap between the first and second sets of conductors defining the picture element regions.

In another embodiment, similarly employing crossed sets of conductors on the supporting plates, and MIM-like diode structures, the conductive terminal layer of the diode structures remote from the one supporting plate and facing the liquid crystal material is formed separately from the actual picture element electrodes, these comprising a superimposed conductor layer, for example of ITO, and are spaced therefrom by insulator material such as silicon nitride so as to form a capacitive coupling. As before, the other conductive terminal layer of the diode structures is constituted by a respective portion of one of the set of address lines carried on the one supporting plate.

In this embodiment, the first-mentioned conductive terminal of the diode structures may be constituted by grains of conductive material, for example, ITO, dispersed in an insulator matrix material and spaced from the other conductive terminal of the diode structure by a thin film of insulator. This dispersion of one of the metal components of the diode structures may be random but with sufficient density to ensure that each picture element sub-electrode is associated with, through capacitive coupling, at least one so-formed diode structure, and preferably a plurality of diode structures.

This manner of diode structure formation avoids the use of conventional photolithographic procedures and can be accomplished using simpler techniques, for example by using powdered ITO and sprinkling the ITO grains over the thin insulator layer carried on the address lines on the one supporting plate.

In a variant of this embodiment the metal component of the diode structures remote from the one supporting plate are formed as discrete dots of conductive material, for example, ITO, deposited via a mask so that the positioning and spacing of the diode structures so-formed are to a considerable extent predetermined rather than random. This deposition may involve evaporation of the conductive material through a suitable mask which in a convenient form may comprise a structure similar to a shadow mask. In addition to avoiding the need for a photolithographic operation, this technique has the further advantages that it is comparatively inexpensive and, in comparison with the aforementioned random dispersion technique, the number of diode structures provided for each picture element, and more precisely the number of diode structures, whether it be one or more, associated with each picture element sub-electrode, can be controlled.

In any of the aforementioned embodiments or variants, each picture element of the liquid crystal display device may have associated therewith at least one storage capacitor. In the case where each picture element electrode on the one supporting plate comprises a plurality of discrete sub-electrodes each serving to define a respective picture sub-element, then each picture sub-element preferably has associated therewith a respective storage capacitor. These storage capacitors may be constituted in part by at least one further conductive layer carried on the one supporting plate which underlies and is insulated electrically from the picture element electrodes on the one supporting plate. Besides constituting in part the storage capacitors, these further conductive layers have another useful and advantageous function in that they may be situated between the picture element electrodes and the underlying address lines and serve to screen the picture element electrodes from their underlying address lines. As a result of this screening, any capacitance between a picture element and its address line is minimised.

Various embodiments of liquid crystal display devices in accordance with the present invention will now be described, by way of example, with reference to the accompanying drawings in which.

Figure 1:
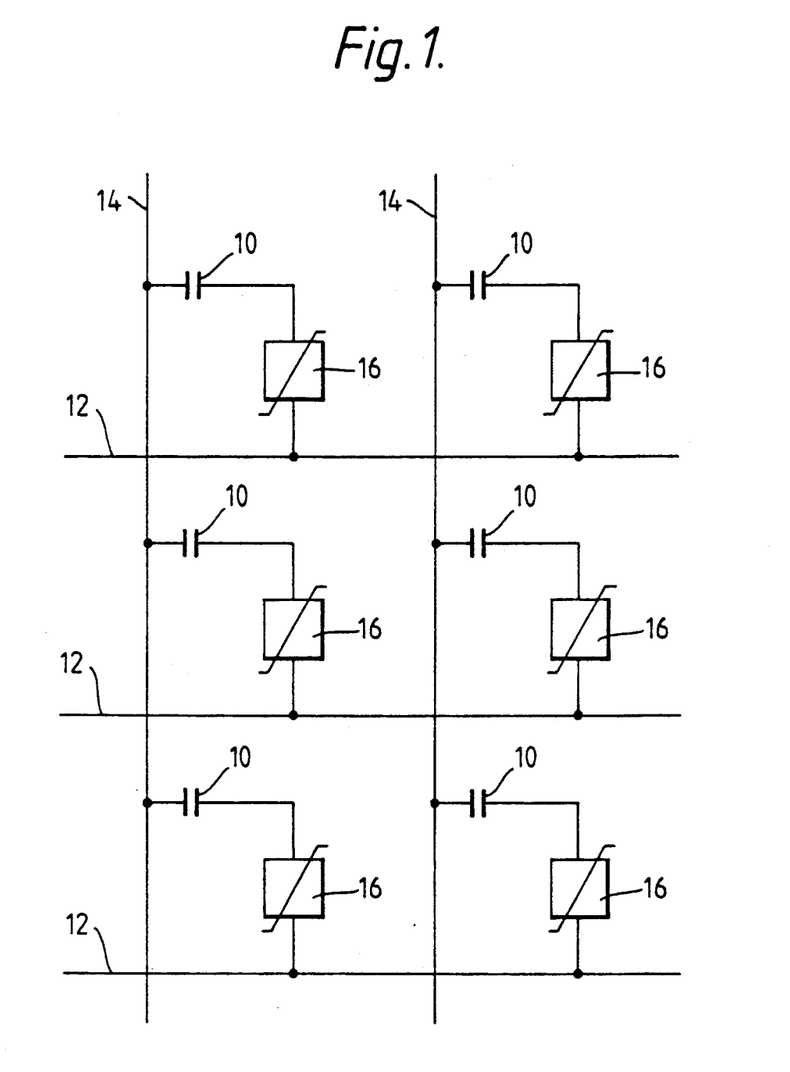
FIG. 1 shows, in plan schematic form, a part of an active matrix liquid crystal display device according to the invention having a matrix array of picture elements controlled by two terminal non-linear switching devices.

Referring to FIG. 1, which is applicable to all the various embodiments and variants described hereinafter, there is shown a part of an active matrix liquid crystal display device having a large number of picture elements, 10, arranged in a matrix array of rows and columns and comprising spaced electrodes with liquid crystal material therebetween. Only six picture elements are illustrated in FIG. 1. The picture elements 10 are addressed via two sets of address lines in the form of conductors 12 and 14 carried on the facing surfaces of two glass supporting plates (not shown in FIG. 1) on which the picture element electrodes are also carried. The conductors of each set are arranged parallel to one another and the two sets extend at right angles to each other in their spaced-apart planes and define at their intersection points the picture element regions.

The row conductors 12 serve as scanning electrodes and are driven by a driver circuit (not shown) which applies a scanning signal to each row electrode 12 sequentially in turn. In synchronism with these scanning signals, data signals are applied to the columns of conductors 14 to produce the required display from the rows of picture elements associated with the row conductors 12 as they are scanned. In the case of a video or TV display device, these data signals comprise video information signals. By appropriately choosing the difference between the scanning and data signals to be sufficiently great, the optical transmissivity of a selected picture element at the intersection of a row conductor 12 and a column conductor 14 can be changed to produce a visible display effect. The picture elements are only activated to produce a display effect in response to both the scanning signal and data signal being applied thereto by means of switching elements 16 in the form of non-linear elements connected in series between each picture element 10 and its row conductor 12. The scanning signal applied to a row conductor 12 causes the switching elements associated with the picture elements of that row to conduct and thereby pass the scanning signal to the picture element. The scanning signal in conjunction with the data signal produces the desired optical effect from the picture element. The data signal by itself is insufficient to cause such an effect. The individual display effects of the large number of picture elements, addressed one row at a time, combine to build up a complete display. Using the transmission/voltage characteristics of a liquid crystal picture element, grey scale levels can be achieved.

The voltage/conduction characteristic of the switching element ideally is bidirectional and symmetrical with respect to zero voltage so that a net dc bias across the picture elements, and consequential electro-chemical degradation of the liquid crystal material, is avoided. However, a voltage/conduction characteristic close to the ideal is acceptable. For convenience the polarity of the drive voltages, that is, the scanning and data signals, is reversed after each complete field.

Active matrix liquid crystal display devices employing two terminal, non-linear switching elements in series with, and laterally spaced with respect to, the picture elements are generally well known. The main elements and general operation of the display device of FIG. 1 is similar in certain respects these known devices and accordingly the above description with regard to FIG. 1 has deliberately been kept brief. For further information on these aspects, therefore, reference is invited to earlier publications describing these generally similar types of display devices such as, for example, U.S. Pat. No. 4,223,308 and British Patent Specification No. 2,147,135, both describing the use of diodes as switching elements, and British Patent Specification No. 2,091,468, describing the use of MIMs as switching elements, details of which we incorporated herein by reference. Other forms of non-linear switching elements may instead be used in the present invention for example $p^+$-i-$p^+$, $n^+$-p-$n^+$ diode structures.

In the following description, various embodiments of display devices and variants in accordance with the invention will be described. In each of these embodiments, the picture element electrodes carried on one of the supporting plates are, for fault tolerance purposes, each associated with a plurality of separately-operating switching elements which are disposed between those picture element electrodes and the associated address line disposed on the supporting plate and underlying the area occupied by the picture element electrodes. Furthermore, each picture element electrode is divided into a number of discrete sub-electrodes which are each connected to at least a respective one of the plurality of switching elements associated with that picture element so that voltages applied to those sub-electrodes are controlled by the respective switching elements. Although the liquid crystal display device according to the invention may be operated in reflection mode, the following embodiments are all intended to be operated in transmission mode. With this in mind, the address lines on the aforementioned supporting plate are formed substantially transparent so as not to impede the passage of light through the picture elements significantly. While not essential in view of their size physically relative to the picture element size, the switching elements are also substantially transparent and, in these particular embodiments, comprise diode structures operating as MIM thin-film structures utilising the Poole-Frenkel effect. As examples of typical dimensions, the picture elements may be approximately 300 by 300 micrometers square, and when each picture element has, say, nine sub-electrodes associated respectively with a single switching element, each sub-electrode may be approximately 100 by 100 micrometers and each switching element approximately 5 to 10 micrometers square.

For simplicity, the same reference numerals are used to designate corresponding parts of the various embodiments.

Figure 2:
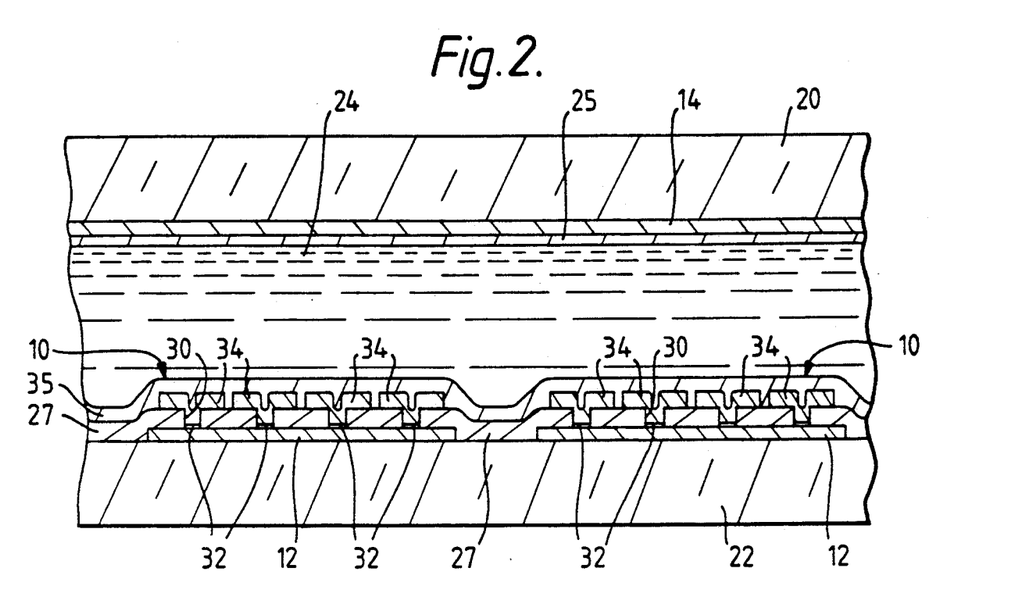
FIG. 2 is a diagrammatic cross-sectional view, not to scale, of one embodiment of display device according to the invention.

Referring to FIG. 2, there is shown in schematic form a cross-sectional view through a first embodiment of active matrix display device according to the invention. The device comprises two mutually spaced transparent supporting plates 20 and 22 whose facing surfaces at least are insulative and between which liquid crystal material 24 is disposed. The plates may be of any suitable material, for example, glass.

The upper supporting plate 20 carries the set of column conductors 14, one of which is visible in FIG. 2, formed of transparent conductive material such as indium tin oxide (ITO) The conductors 14 and intervening areas of the plate surface are covered by an insulative orientation layer 25 of polyimide.

The lower supporting plate 22 carries the set of row conductors 12, two of which are shown in FIG. 2, which, again, are formed of transparent conductive material such as ITO. The two sets of conductors 12 and 14, as previously mentioned, extend substantially at right angles to one another and define at their intersections the locations of the matrix of picture elements, here designated 10. The conductors 12 and 14 as shown are each formed as flat-surfaced strips of substantially constant width, producing substantially rectangular picture elements. Alternatively, the conductors 12 and 14 need not be formed as unitary strips but may comprise discrete areas of conductive material at the picture elements regions interconnected by separately-formed conductive tracks.

Disposed over the conductors 12 and the intervening surface areas of the plate 22 is an insulative layer 27, deposited either as a single layer or a plurality of separate layers, of silicon nitride, although silicon dioxide may be used instead. Portions of this silicon nitride layer 27 at the regions where the conductors 12 and 14 intersect, and corresponding in area substantially with the individual picture element areas determined by the area of overlap between the conductors 12 and 14 at their intersections, are formed with pits 30 by selective etching photolithographically through a mask. Each such portion of the layer 27 has a matrix of regularly spaced pits, this being a 4 by 4 matrix in the example illustrated in FIG. 2 although only four such pits are visible in the cross-section shown, which occupy an area corresponding substantially with the picture element area over the conductors 12 and are spaced substantially uniformly with respect to that area.

Following etching of these pits 30 a thin film, around 150 Angstroms, of non-stoichiometric silicon nitride is deposited over the structure thus forming a thin film of insulator on the surface of conductors 12 at 32 the bottom of each pit.

Figure 3:
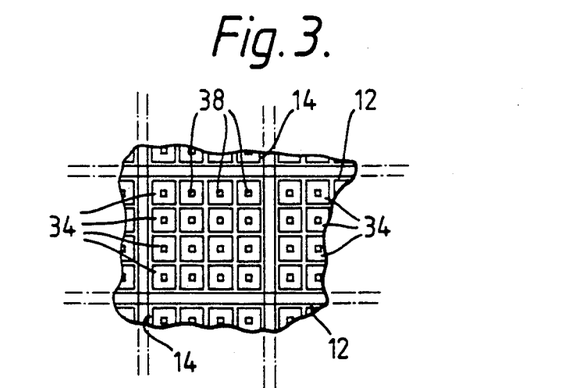
FIG. 3 is a scrap, diagrammatic plan view of part of the display device of FIG. 2.

Discrete dots 34 of transparent conductive material, such as ITO, are deposited over the layer 27 and extend into respective ones of these pits, either by deposition through a mask or by selective etching of a continuous layer deposited over the layer 27. Each dot 34 is in the form of a rectangular or circular layer which extends over its respective pit 30 and laterally over the immediately adjacent surface of the layer 27 surrounding the pit, as shown in FIG. 2. Thus, each picture element 10 has a 4 by 4 regular matrix of dots 34 (sixteen altogether), which, when viewed from above in FIG. 2, and as shown in FIG. 3, occupy a major proportion of the area of the picture element and are spaced apart from one another uniformly within that area. These dots 34 constitute the picture element electrodes associated with the supporting plate 22, each such picture element electrode in effect being divided into sixteen individually-energisable sub-electrodes 34, defining a corresponding number of picture sub-elements, $C_{LC}$, which collectively serve as the picture element electrode on the supporting plate 22.

Each 4 by 4 matrix of sub-electrodes together with the overlying portion of a conductor 14, acting as a spaced electrode, and the liquid crystal material therebetween constitute a picture element.

The thin layer of silicon nitride 32 at the bottom of each pit 30 together with respective immediately adjacent surface portions of the conductors 12 and dots 34 constitute a two terminal, non-linear diode structure which is connected electrically in series between the conductor 12 and the associated picture element sub-electrode defined by the dot 34. The sixteen sub-electrodes of each picture element are therefore connected to the same conductor 12 through a respective diode structure.

A further polyimide orientation layer 35 is deposited over the layer 27 and dots 34.

Figure 4:
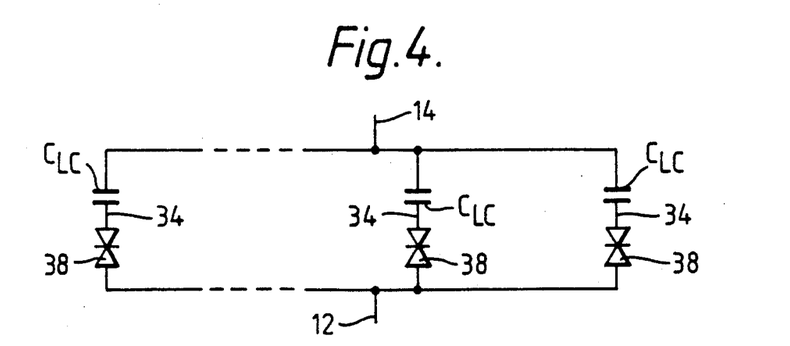
FIG. 4 illustrates schematically the effective electrical circuit of a typical one of the picture elements of the device of FIG. 2.

The effective electrical circuit configuration of a typical picture element and associated switching elements of the display device of FIG. 2 is illustrated in FIG. 4. For simplicity, only three of the sixteen sub-electrodes and associated diode structures are shown, and any parasitic capacitances which might be present have been ignored.

The MIM type diode structures, being two terminal bidirectional non-linear devices, are here represented, at 38, by back-to-back diodes for convenience. The application of a suitable voltage comprising the scanning signal and data signal to the electrodes 12 and 14 respectively exceeding the threshold voltage of the diode structures to the row conductor 12 causes the diode structures 38 to "switch" and conduct under the Poole Frenkel effect so that the voltage is transferred to the dot sub-electrodes 34. This voltage, in conjunction with a further voltage signal (the data signal) applied simultaneously to the relevant conductor 14 produces in each of the picture sub-elements, defined by the sub-electrodes 34, the required electro-optic effect. Below this threshold voltage, the diode structures 38 are non-conductive. Because the diode structures are bidirectional and substantially symmetric devices, the polarity of the applied voltages can be reversed in successive fields so as to avoid a DC component acting on the liquid crystal material and the consequential electro-chemical degradation of the material.

Such a device is relatively simple, and inexpensive, to construct. Moreover, in the event of failure of one, or even several, of the picture sub-elements through defects in the associated diode structures, the picture element is still capable of functioning adequately to produce an acceptable display effect. Since all the component layers are substantially transparent, the passage of light through the device when operated in transmission mode is not significantly impeded by the presence of the plurality of switching elements beneath the picture element electrodes. The size of the diode structures 38 shown in FIG. 2 have deliberately been exaggerated and in reality the area they occupy relative to the picture element area is small. Hence, even if the diode structures 38 are not transparent, their effect on light transmission need not be very significant.

Figure 5:
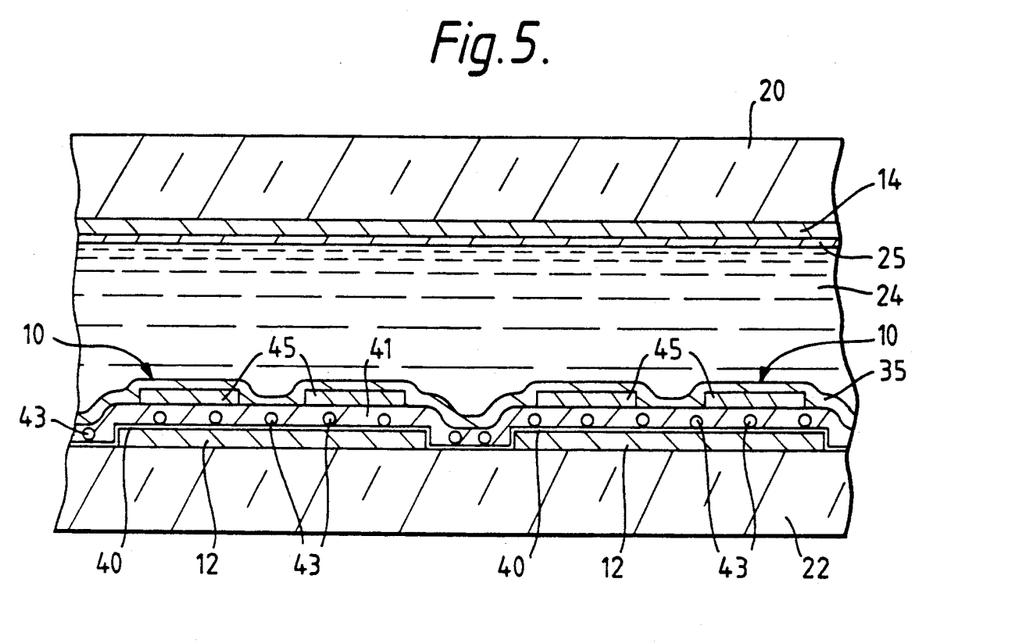
FIG. 5 is a diagrammatic cross-sectional view, not to scale, of another embodiment of a display device according to the invention.

Referring now to FIG. 5, there is shown in schematic form a cross-section through a second embodiment of active matrix liquid crystal display device according to the invention. This embodiment shares many similarities with the previous embodiment. For this reason corresponding component parts are designated with the same reference numerals and will not be described again here in detail.

An important distinction between the embodiment of FIG. 5 and that of FIG. 2 is that the MIM type diode structures are formed in a different manner and their terminals remote from the address conductors 12 are not connected directly to the picture element sub-electrodes but instead are capacitively coupled to those sub-electrodes.

A thin layer 40 of non-stoichiometric silicon nitride is deposited to a thickness of around 0.05 micrometers (500 Angstroms) over the conductors 12 and the intervening surface area of the supporting plate 22. Silicon oxide may be used instead of silicon nitride. Over the surface of this layer 40 is disposed a further, thicker, layer 41 of insulative material such as silicon nitride or polyimide in which ITO grains 43 resting directly on the thin layer 40 are embedded. These grains 43, which are generally spherical and substantially similar in size, say, around 1 micrometer diameter, are dispersed randomly in the layer 41 in density sufficient to ensure that a suitable number of grains for example around 15 to 100, are present scattered over the surface of the layer 40 on the conductors 12 at each picture element location.

The grains 43 may be dispersed over the layer 40 as a suspension in alcohol Following evaporation of the alcohol, the layer 41 is deposited using silicon nitride so as to cover and surround the grains apart from the region where they contact the thin silicon nitride layer 40. In an alternative method, in which the layer 41 comprises polyimide, the grains 43 may be mixed thoroughly with polyimide and the mixture then spun over the surface of the layer 40, the grains then being allowed to settle on, and contact the thin layer 40. Both these deposition techniques offer the advantage that they avoid the need for a photolithographic process and are comparatively simple, and economic, to perform.

While the dispersion of the grains 43 in the layer 41 is accomplished in a relatively random fashion, the quantity of grains used in proportion in the material of the layer 41 results in sufficient numbers of grains being present at each picture element location for the desired purpose, as will be explained. In the example illustrated in FIG. 5, the resulting distribution of grains 43 is such that several grains are obtained, in this particular case five and six, across the width of each complete conductor 12 which are spaced substantially uniformly. Of course, the grains are not necessarily aligned with one another exactly as shown in this schematic representation. The grains are similarly distributed along the lengths of the conductors 12, and hence along the other dimension of the picture element. If an area of the conductors 12 corresponding to a typical picture element area is considered, around twenty-five grains 43 arranged in a planar two dimensional array will be involved. Whilst the spacing between grains can not be determined precisely, their distribution will usually be such that, in each of these areas, the resultant array occupies a major proportion of the area.

Each of the grains 43 which overlie a conductor 12 in conjunction with a portion of the thin silicon nitride layer 40 and surface portion of the electrode 12 immediately beneath it constitute a MIM type diode structure.

The layer 41 has a thickness greater than the size of the grains 43 so that the uppermost surface of the grains are spaced from the surface of the layer 41. On the surface of this layer 41 are deposited discrete electrode layers 45 of, for example, ITO, which constitute picture element sub-electrodes. Each picture element for example has associated therewith four such sub-electrodes arranged in a planar 2 by 2 matrix array, although the actual number of sub-electrodes 45 provided for each picture element may be varied if desired. The four sub-electrodes, which are of similar size and may be rectangular or circular in shape, collectively constitute the picture element electrode on the supporting plate 22 and each defines with a corresponding overlying portion of electrode 14 and liquid crystal material therebetween a picture sub-element. Each sub-electrode 45 overlies a number, typically between four to nine, diode structures which serve to control the application of voltages thereto. The sub-electrodes 45 are spaced from their associated diode structures by silicon nitride material of the layer 41 so that electrical coupling between the diode structures and the sub-electrodes is achieved capacitively.

The sub-electrodes 45 and intervening surface areas of the layer 41 are covered by a polyimide orientation layer 35.

Figure 7:
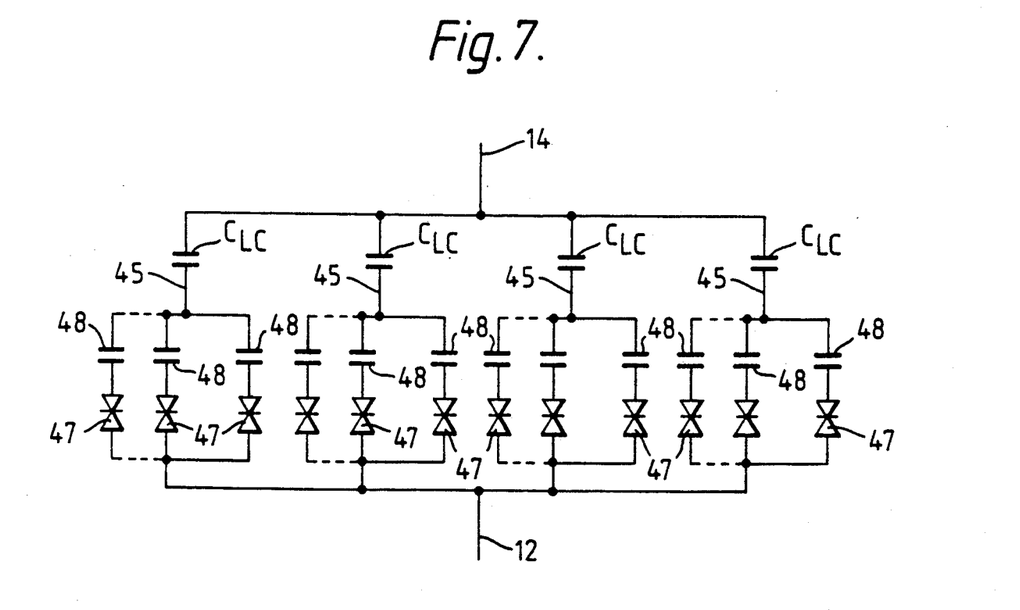
FIG. 7 is a schematic illustration of the effective electrical circuit of a typical one of the picture elements of the devices of FIGS. 5 and 6.

The effective electrical circuit configuration of a typical one of the picture elements of this embodiment is illustrated in FIG. 7. In this figure, the MIM type diode structures are represented by back-to-back diodes 47 and the capacitive coupling between the diode structures 47 and the sub-electrodes 45 by capacitors 48.

It will be appreciated that like the previous embodiment this embodiment offers a high degree of fault tolerance. As each picture element 10 is associated with a large number of diode structure switching elements, and each individual sub-electrode 45 itself is associated with a plurality of diode structures, defects in a number of the switching elements can be tolerated without the operation of the picture elements being seriously impaired. As with the previous embodiment, passage of light is not significantly impeded when the device is operated in transmission mode by the presence of such large numbers of switching elements beneath the picture element electrodes in view of the fact that substantially transparent materials are employed to form these switching elements. As before, the switching elements may be formed sufficiently small in relation to the picture elements that they have minimal effect on the transmission of light even if they are not substantially transparent.

This embodiment offers the further advantage over the previous embodiment in that variations in voltage applied across the electrodes of the picture elements arising from threshold variations in the individual diode structures are reduced using capacitive division provided by the plurality of capacitors 48 associated with each sub-electrode 45. The capacitance value of the capacitors 48, which is determined by the size of the grains 43, is small relative to the capacitance of the picture sub-elements, which is determined by the size of the sub-electrodes 45. Hence a comparatively large voltage drop exists across each capacitor 48. If therefore, for example, the effective capacitance of the plurality of parallel-connected capacitors 48 associated with one picture sub-element is one tenth of the capacitance value of the picture sub-element, then a one volt variation across the diode structures 47 associated with that sub-element gives rise to only 100 mv variation across the sub-element.

Operation of the display device is otherwise generally similar to that described with regard to the embodiment of FIG. 2. It is necessary to reverse the polarity of the applied drive voltages after each field to "reset" the picture elements otherwise charge will be fixed in each picture element. Such polarity reversal serves also to prevent electrochemical degradation of the liquid crystal material as before.

Figure 6:
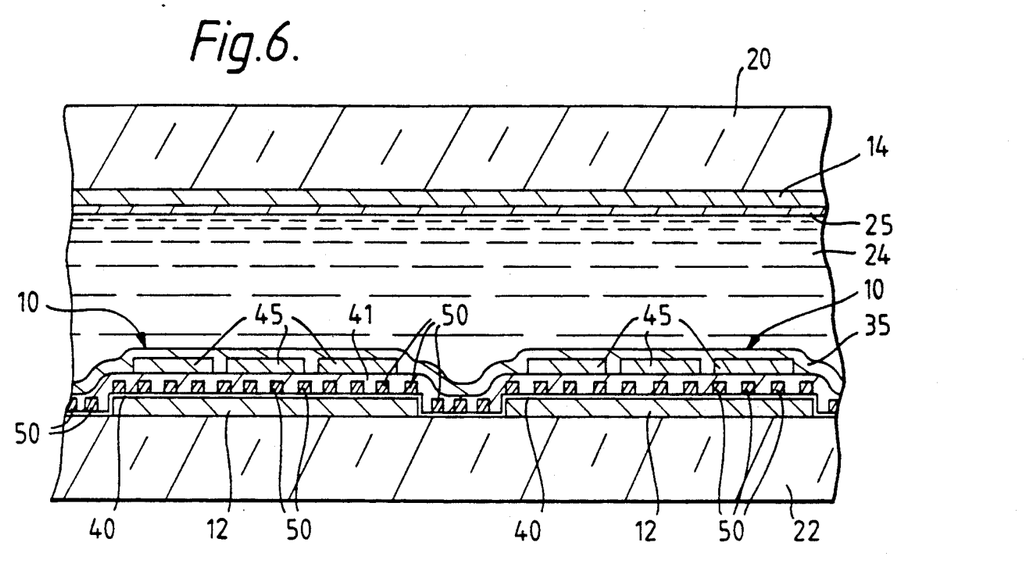
FIG. 6 is a diagrammatic cross-sectional view, not to scale, of a further embodiment of a display device according to the invention.

Referring now to FIG. 6, there is shown, in schematic form, a cross-sectional view through a third embodiment of a display device according to the invention. This embodiment shows many similarities with the embodiment of FIG. 5, and may be regarded as a variant of that embodiment. Again, therefore, corresponding parts of the device have been designated the same reference numerals for simplicity.

In this embodiment, the grains 43 are replaced by discrete dots 50 of conductive material such as ITO. The dots are deposited over the thin silicon nitride layer 40 prior to deposition of the thicker silicon nitride layer 41 by evaporation through a mask so that the size and spacing of the dots is controlled to a considerable extent so that they have a regular spacing in relation to, and lie substantially in registration with, the actual picture elements. The mask employed in depositing the dots 50 may be a shadow mask. The so-formed dots 50 have a substantially uniform distribution over the surface of the layer 40. The silicon nitride layer 41 is then laid down over the dots 50 and again has a thickness greater than the height of the dots 50 so that the upper surfaces of the dots are spaced from the surface of the layer 41. The upper surfaces of the dots 50 and the opposing surface portions sub-electrodes 45 constitute, together with the silicon nitride of layer 41 separating them acting as dielectric, capacitors coupling the associated MIM type diode structures and sub-electrodes 45.

In this embodiment each picture element is provided with nine sub-electrodes 45 collectively constituting the picture element electrode and arranged in a planar 3 by 3 matrix array occupying an area substantially corresponding to the area of the picture element. The dots 50 are so distributed that each sub-electrode is associated with three diode structures.

The electrical circuit configuration of a typical one of the picture elements of this embodiment corresponds generally with that shown in FIG. 7, except that there are nine picture sub-elements rather than four as shown, and each sub-element is associated with just three diode structures 47 and three series capacitors 48. Operation of the device is generally the same as that of the previous embodiment with similar advantages being obtained.

Figure 8:
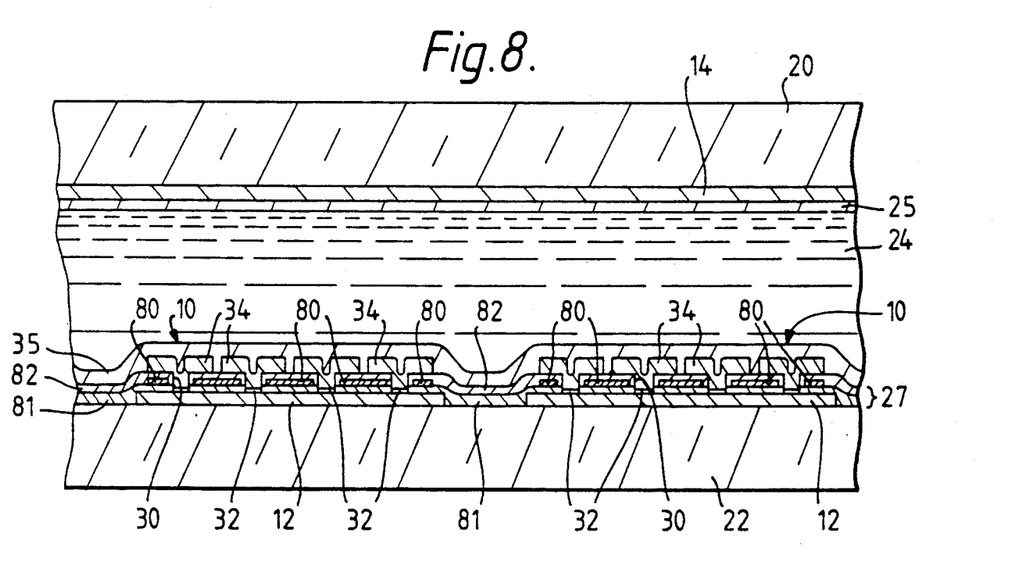
FIGS. 8 and 10 illustrate variants of the display devices shown in FIGS. 2 and 5 respectively, again not to scale, in which storage capacitors are provided for the picture elements.
Figure 10:
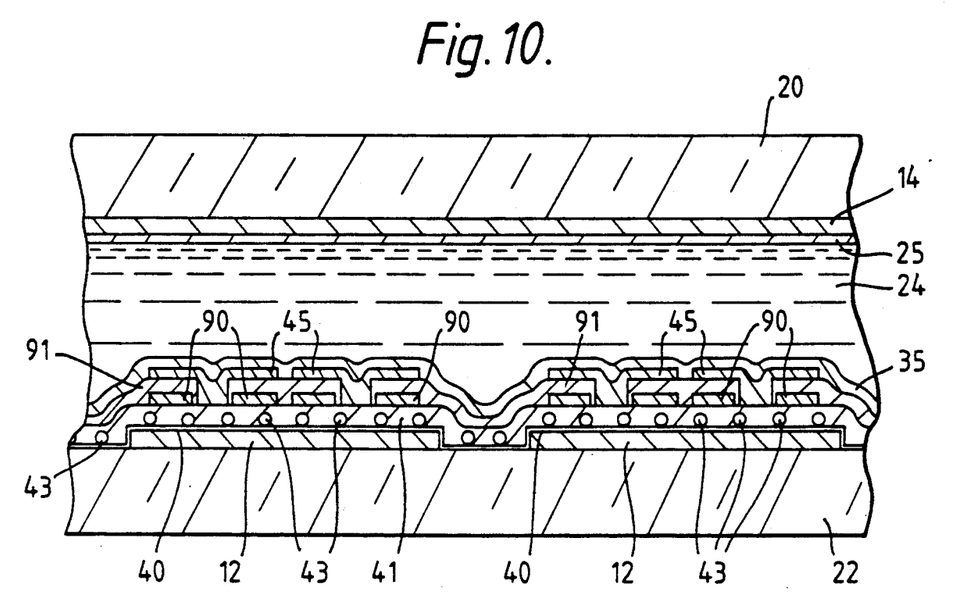

FIGS. 8 and 10 show respectively variants of the embodiments described with reference to FIGS. 2 and 5. As before, like parts have been designated with the same reference numerals In each of these variants the display devices have been modified so as to minimise capacitive coupling between the picture element sub-electrodes and the underlying portions of their associated address lines and at the same time to form a storage capacitor for each picture sub-element.

The storage capacitors are designed to have capacitance values many times larger than the capacitance of the picture sub-elements With regard firstly to the variant of the embodiment of FIG. 2 shown in FIG. 8, it is seen that a further electrically-conductive layer 80 is incorporated in the device structure for each picture element. These layers 80, are transparent and formed, for example, of ITO. In view of the addition of the layers 80, the silicon nitride layer 27 comprises two separately-deposited layers 81 and 82, the second layer 82 being disposed over the first layer 81 and sandwiching the layers 80, deposited on the first layer prior to deposition of layer 82, therebetween. The layers 80 themselves are formed by depositing a continuous ITO layer over the first silicon nitride layer 81 and selectively etching this layer to leave the required array of individual layers 80 extending over an area substantially corresponding to, and in registration with, their respective picture-elements 10. Each layer 80, and the layers 81 and 82 are formed with apertures through which the conductive layers constituting sub-electrodes 34 extend to contact the silicon nitride thin films 32 with the layers 80 being spaced slightly, and hence electrically insulated from, their associated sub-electrode layers 34, and also the underlying address lines 12.

The layers 80 of the picture elements 10 in each respective row are electrically isolated from one another. The layers 80 of each picture element in each respective column are interconnected electrically, via integral bridges, not shown in FIG. 8, left following selective etching of the continuous conductive layer constituting the layers 80, and each interconnected column of layers 80 is connected by means not visible in FIG. 8 with its associated column conductor 14.

Figure 9:
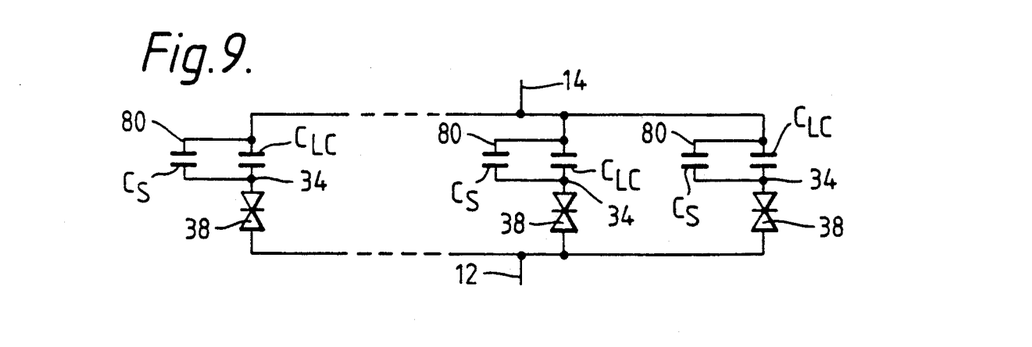
FIGS. 9 and 11 are schematic effective circuit representations, similar in respects to the circuits shown in FIGS. 4 and 7, of typical ones of the picture elements of the devices of FIGS. 8 and 10 respectively.

The effective circuit configuration for a typical picture element of the device of FIG. 8 is illustrated schematically in FIG. 9. Comparing the circuit of FIG. 9 with that of FIG. 4, it is seen that portions of the layers 80 in conjunction with their respective overlying sub-electrodes 34 and insulative layer 82 therebetween, constitute a capacitance Cs in parallel across each picture sub-element $C_{LC}$. The capacitances Cs serve as storage capacitors in operation of the device in known manner.

Referring now to FIG. 10, the display device illustrated is a variant of the embodiment of FIG. 5 with modifications similar to those described with reference to FIG. 8. In particular, additional transparent, electrically conductive, layers are interposed between the picture element sub-electrodes 45 and the underlying conductor 12. In this case, however, the additional conductive layer of each picture element is configured so as to define physically separated portions, referenced 90, each of which corresponds generally in size, and is registered with a respective picture element sub-electrode 45. However, the layer portions 90 associated with the sub-electrodes 45 of each picture element are still interconnected electrically, although these interconnections are not visible in FIG. 10.

The layer portions 90, and their interconnections, are formed on the surface of the silicon nitride layer 41 by the selective etching of a deposited continuous layer and are spaced from the sub-electrodes 45 by a further silicon nitride layer 91 extending continuously over the layers 41 and 90. The layer portions 90, which correspond generally in shape with their associated picture element sub-electrode 45, are electrically insulated from their associated overlying sub-electrode 45 and underlying address lines 12. The layers 90 and 91 are provided with registered openings through which the sub-electrodes 45 extend so as to contact the upper surface of the layer 41 for capacitive coupling with the diode structures underlying this extension in a manner similar to that in the embodiment of FIG. 5. The extensions of the sub-electrodes 45 are insulated from the layer portions 90 by material of the layer 91. Comparing the devices of FIGS. 10 and 5 therefore it will be seen that in the configuration shown in FIG. 10, the picture element sub-electrodes 45 are no longer wholly planar but have their peripheral portions surrounding the diode structure spaced further from the conductor 12 so as to accommodate the additional conductive layer 90 and the necessary further insulation layer 91.

The layers 90 of adjacent picture elements in the same row are electrically isolated from each other.

Again, the layers 90 associated with picture elements of each respective column of picture elements are interconnected electrically with one another (via column-wise bridges, not visible in FIG. 10, left following etching of the continuous conductive layer) and with the respective column conductor 14.

Figure 11:
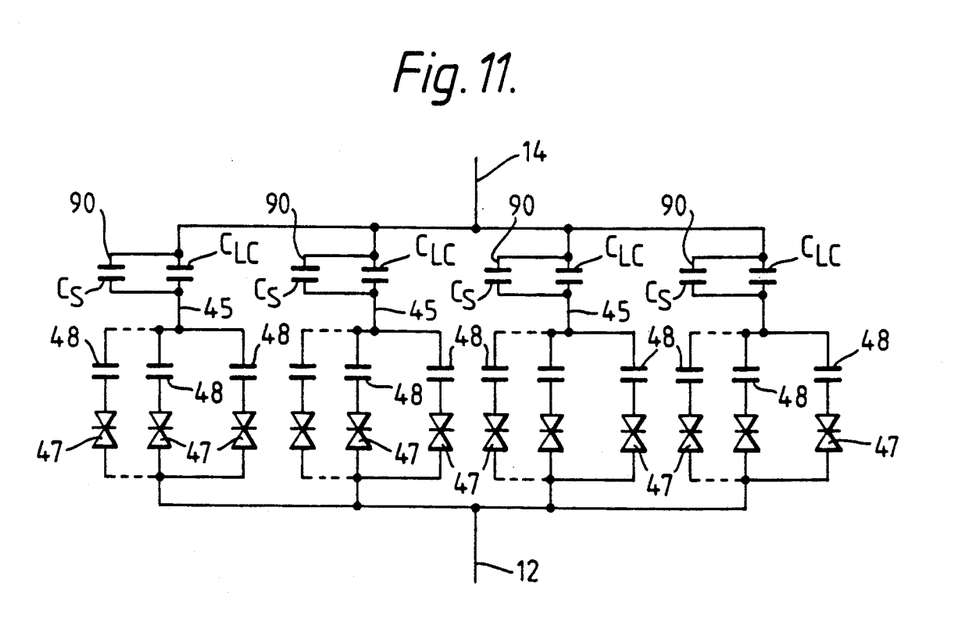

The effective electrical circuit configuration of a typical picture element of the display device of FIG. 10 is illustrated in simple form in FIG. 11. Components corresponding to those in FIG. 7 are designated with the same reference numerals As can be seen from this figure, each picture sub-element, $C_{LC}$, has associated therewith a storage capacitance $C_S$ connected in parallel thereacross, this storage capacitance being formed by the layer portion 90 and the opposing portion of sub-electrode 45, with the insulative material of layer 91 therebetween.

Figure 12:
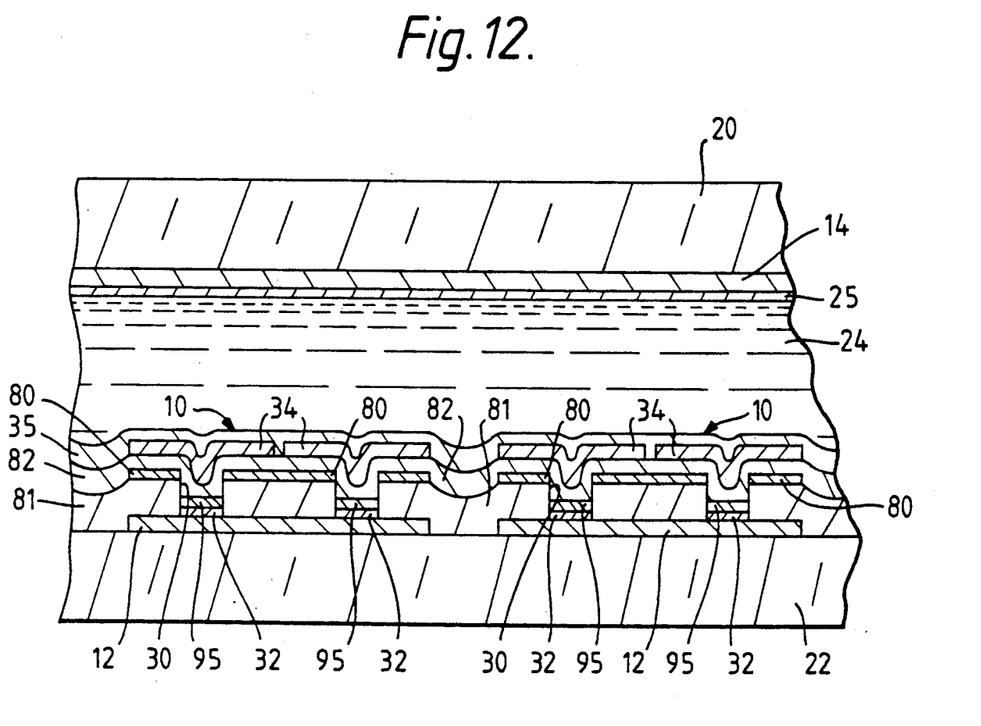
FIG. 12 shows a diagrammatic cross-sectional view, not to scale, through another display device according to the invention also incorporating storage capacitors for the picture elements, and in which the effective circuit of a typical picture element is generally similar to that shown in FIG. 11.

Referring now to the embodiment shown in FIG. 12, this embodiment shares many similarities with that of FIG. 8 except that, as with the embodiment of FIG. 10, the picture element sub-electrodes, here referenced again 34 for simplicity, are capacitively coupled to their associated switching elements. In this example, each picture element 10 comprises a 2 by 2 array of picture sub-elements each of which is capacitively coupled to one switching element. Components of the device corresponding generally with those of FIG. 8 have been designated the same reference.

As before, a continuous conductive layer 80 is interposed between the sub-electrodes 34 of each picture element and its underlying address line 12 and insulated therefrom by layers 82 and 81 respectively. The layer 80 is provided with apertures overlying pits 30 formed in the layer 81. At the bottom of these pits, thin films of non-stoichiometric silicon nitride 32 are deposited. However, instead of the sub-electrodes 34 extending downwardly into the pits 30 to contact the thin films 32 as previously, they extend in this embodiment only part way into the pits. Deposited on the upper surface of the thin films 32 within the pits 30 are respective conductive layers 95 formed simultaneously with, and thus of the same material as, the layers 80 prior to deposition of the layer 82. The layer 82 is disposed over both the layers 80 and the layers 95 in the pits 30 so that, when subsequently deposited, the conductive layer constituting the sub-electrodes 34 extends downwardly over the layer 82 in the region of the pits 30 and is spaced from the conductive layers 95 by the layer 82.

The layers 95 together with their associated underlying films 32 and surface portions of address lines 12 form MIM type diode structures as before, there being one diode structure for each sub-electrode, and hence each picture sub-element, of each picture element. These diode structures are capacitively coupled to their respective sub-electrodes 34.

Also as previously, the layers 80 of picture elements in a column are interconnected electrically columnwise via bridges not shown in FIG. 12 but are electrically isolated from the layers of adjacent picture elements in the same row. Each interconnected column of layers 80 is connected to the opposing column conductor 14.

The effective electrical configuration of a typical picture element is similar to that shown in FIG. 9 representing a typical picture element of the embodiment of FIG. 8 except that a coupling capacitance, similar to that illustrated at 48 in FIG. 11, exists in series between each diode structure switching element 38 and its associated picture element sub-electrode 34. The layers 80 in conjunction with the overlying sub-electrodes 34 and intervening insulation material of layer 82 constitute a storage capacitor, Cs, for each picture sub-element.

With regard to the embodiments of FIGS. 8, 10 and 12, the conductive layers 80 and 90 may be electrically connected to a source of fixed potential rather than the associated column conductor 14, the polarity of this potential being reversed for alternate fields.

The embodiment described with reference to FIG. 7 can be modified in a similar manner to that described with reference to FIG. 10 for the embodiment of FIG. 5 to incorporate storage capacitors by incorporating a transparent conductive layer between each sub-electrode 45 and the underlying address conductor 12.

In all these embodiments incorporating storage capacitors, the further conductive layers provided, 80 and 90, serve the additional useful function of screening the picture element sub-electrodes 34 and 45 from their underlying address lines 12 and so minimise any capacitive coupling between the sub-electrodes and address lines which might otherwise exist.

Although in FIGS. 8 and 12, the additional conductive layer 80 associated with each picture element is shown as being continuous, they could instead be defined as physically individual portions for each sub-electrode, while still being electrically interconnected, in the same manner as described with reference to FIG. 10. Conversely, the individually defined layer portions 90 of the embodiment of FIG. 10 could be formed as a continuous layer substantially co-extensive with the respective picture element area but still provided with apertures through which the sub-electrode layers 45 extend towards the switching elements in a manner similar to that of FIGS. 8 and 12.

All the above-described embodiments and variants offer the advantage over known display device arrangements in that the spacing between the picture elements can be minimised since the address lines on one supporting plate and the associated switching elements are located beneath the picture elements unlike the known arrangements in which the switching elements are arranged on the supporting plate laterally with respect to the picture elements.

I claim:
1. A liquid crystal display device comprising
   (a) a pair of spaced supporting plates,
   (b) a liquid crystal material disposed between said supporting plates,
   (c) a plurality of picture elements disposed in a matrix array, wherein each of said plurality of picture elements is defined by opposing electrodes disposed on said supporting plates, and wherein each picture electrode on one of said two supporting plates includes a plurality of discrete sub-electrodes defining respective picture sub-elements,
   (d) a plurality of switching elements disposed on said one of said supporting plates, said switching elements being two terminal, bi-directional non-linear elements, each of said plurality of discrete sub-electrodes being connected to at least one of said switching elements, and
   (e) a plurality of address lines disposed on said one of said supporting plates, said plurality of address lines being disposed between said plurality of sub-electrodes and said one of said supporting plates, said switching elements being connected in series between said picture sub-elements and said address lines, wherein said switching elements are operable in parallel with first terminals being connected to an associated address line.

2. A liquid crystal display device according to claim 1, wherein said switching elements are diode structures.

3. A liquid crystal display device according to claim 2, wherein said diode structures each include a thin layer of silicon nitride sandwiched between two electrically conductive layers of indium tin oxide material, said electrically conductive layers forming respective terminals of said diode structures.

4. A liquid crystal display device according to claim 1, wherein a conductive layer forming one terminal of said two terminal non-linear elements also serves as at least part of an associated picture sub-element electrode.

5. A liquid crystal display device according to claim 4, wherein a second terminal of said two terminal non-linear elements is constituted by a respective portion of an associated address line disposed on said one of said supporting plates, said one terminal being spaced from said associated address line on said one of said supporting plates by a thin layer of an insulator.

6. A liquid crystal display device according to claim 1, wherein insulators are disposed between one terminal of said two terminal non-linear elements and associated ones of said picture sub-electrodes to define capacitive couplings between said switching elements and said sub-electrodes.

7. A liquid crystal display device according to claim 6, wherein conductive components forming said one terminal of said two terminal non-linear elements include conductive grains dispersed in an insulator matrix material.

8. A liquid crystal display device according to claim 6, wherein conductive components forming said one terminal of said two terminal non-linear elements include discrete dots of conductive material disposed through a mask.

* * * * *